US011106563B2

United States Patent
Ajiro et al.

(10) Patent No.: US 11,106,563 B2
(45) Date of Patent: Aug. 31, 2021

(54) LOG ANALYSIS DEVICE, LOG ANALYSIS METHOD, AND RECORDING MEDIUM STORING PROGRAM

(71) Applicant: NEC Corporation, Tokyo (JP)

(72) Inventors: Yasuhiro Ajiro, Tokyo (JP); Zong Bo, New York, NY (US); Xu Jianwu, Lawrenceville, NJ (US)

(73) Assignee: NEC CORPORATION, Tokyo (JP)

( * ) Notice: Subject to any disclaimer, the term of this patent is extended or adjusted under 35 U.S.C. 154(b) by 286 days.

(21) Appl. No.: 16/089,196

(22) PCT Filed: Mar. 21, 2017

(86) PCT No.: PCT/JP2017/011102
§ 371 (c)(1),
(2) Date: Sep. 27, 2018

(87) PCT Pub. No.: WO2017/169949
PCT Pub. Date: Oct. 5, 2017

(65) Prior Publication Data
US 2020/0301810 A1 Sep. 24, 2020

(30) Foreign Application Priority Data
Mar. 30, 2016 (JP) .............................. JP2016-067122

(51) Int. Cl.
*G06F 11/00* (2006.01)
*G06F 11/34* (2006.01)

(52) U.S. Cl.
CPC ...... *G06F 11/3476* (2013.01); *G06F 11/3409* (2013.01); *G06F 11/3452* (2013.01)

(58) Field of Classification Search
CPC ............. G06F 11/3476; G06F 11/3409; G06F 11/3452; G06F 11/079; G06F 11/0766;
(Continued)

(56) References Cited

U.S. PATENT DOCUMENTS

2008/0004841 A1   1/2008  Nakamura
2009/0217099 A1*  8/2009  Kato ................... G06F 11/3409
                                              714/37
(Continued)

FOREIGN PATENT DOCUMENTS

JP   2001-195285 A   7/2001
JP   2008-009842 A   1/2008
(Continued)

OTHER PUBLICATIONS

Ajay Mahimkar et al., "Troubleshooting Chronic Conditions in Large IP Networks," Dec. 10-12, 2008, pp. 1-12, <URL:https://www.cs.utexas.edu/~yzhang/papers/chronic-conext08.pdf>.
(Continued)

*Primary Examiner* — Joseph D Manoskey
(74) *Attorney, Agent, or Firm* — Sughrue Mion, PLLC

(57) ABSTRACT

A log analysis device includes a correlation model generation unit that generates a correlation model between a pattern of a log output from a monitored target in a prescribed period and the monitored target, based on time series of the pattern and an operating status of the monitored target,
(Continued)

and a determination unit that determines existence of an abnormality in the monitored target based on the correlation model.

11 Claims, 17 Drawing Sheets

(58) Field of Classification Search
CPC .............. G06F 11/3006; G06F 11/3055; G06F 11/3065; G06F 11/3447
See application file for complete search history.

(56) References Cited

U.S. PATENT DOCUMENTS

| | | | | |
|---|---|---|---|---|
| 2012/0185737 | A1* | 7/2012 | Ishiou | G06F 11/0751 714/48 |
| 2012/0278663 | A1* | 11/2012 | Hasegawa | G06F 11/079 714/47.1 |
| 2015/0026521 | A1* | 1/2015 | Yabuki | G06F 11/0751 714/37 |
| 2016/0124823 | A1* | 5/2016 | Ruan | G06F 11/0709 714/26 |

FOREIGN PATENT DOCUMENTS

| | | |
|---|---|---|
| JP | 2010-086099 A | 4/2010 |
| JP | 2014-120001 A | 6/2014 |
| JP | 2014-153721 A | 8/2014 |
| JP | 2015-095060 A | 5/2015 |

OTHER PUBLICATIONS

Written Opinion of the International Searching Authority of PCT/JP2017/011102 dated Jun. 20, 2017.
International Search Report of PCT/JP2017/011102 dated Jun. 20, 2017.
Japanese Office Action for JP Application No. 2018-509072 dated Apr. 6, 2021 with English Translation.
Kimura et al., "Mining Network Logs for Diagnosing Large-scale Networks Problems", IEICE Technical Report, NS2011-225 (Mar. 2012), Japan, The Institute of Electronics, Information and Communication Engineers, Mar. 1, 2012, the 111st vol. No. 468, pp. 261-264.

* cited by examiner

Fig. 4

| LOG INFORMATION |
|---|
| ... |
| 2015/08/17 08:21:37 [SV008] JNW 3258 HAS STARTED |
| 2015/08/17 08:21:59 [SV003] CPU USAGE RATE HAS EXCEEDED THRESHOLD [192.168.1.23] |
| 2015/08/17 08:23:18 [SV007] JNW 082 HAS STARTED |
| 2015/08/17 08:25:37 [SV004] REQUEST TO SV003 HAS TIMED OUT |
| 2015/08/17 08:26:16 [SV001] JNW 529 HAS ENDED |
| 2015/08/17 08:26:30 [SV004] REQUEST TO SV003 HAS TIMED OUT |
| 2015/08/17 08:26:37 [SV008] JNW 3258 HAS ENDED |
| 2015/08/17 08:27:12 [SV004] REQUEST TO SV003 HAS TIMED OUT |
| 2015/08/17 08:35:01 [SV007] JNW 082 HAS ENDED |
| 2015/08/17 08:35:01 [PF] ABNORMALITY HAS OCCURRED IN ALIVE MONITORING [172.13.1.58] |
| ... |

Fig. 5

| PATTERN ID | FORMAT PATTERN |
|---|---|
| 039 | <VARIABLE:TIME STAMP>[<VARIABLE:CHARACTER STRING] JNW <VARIABLE:VALUE> HAS STARTED |
| 071 | <VARIABLE:TIME STAMP>[<VARIABLE:CHARACTER STRING] JNW <VARIABLE:VALUE> HAS ENDED |
| 144 | <VARIABLE:TIME STAMP> ABNORMALITY HAS OCCURRED IN ALIVE MONITORING [<VARIABLE:IP>] |
| 223 | <VARIABLE:TIME STAMP>[<VARIABLE:CHARACTER STRING] CPU USAGE RATE HAS EXCEEDED THRESHOLD [<VARIABLE:IP>] |
| 585 | <VARIABLE:TIME STAMP> [SV004] REQUEST TO SV003 HAS TIMED OUT |

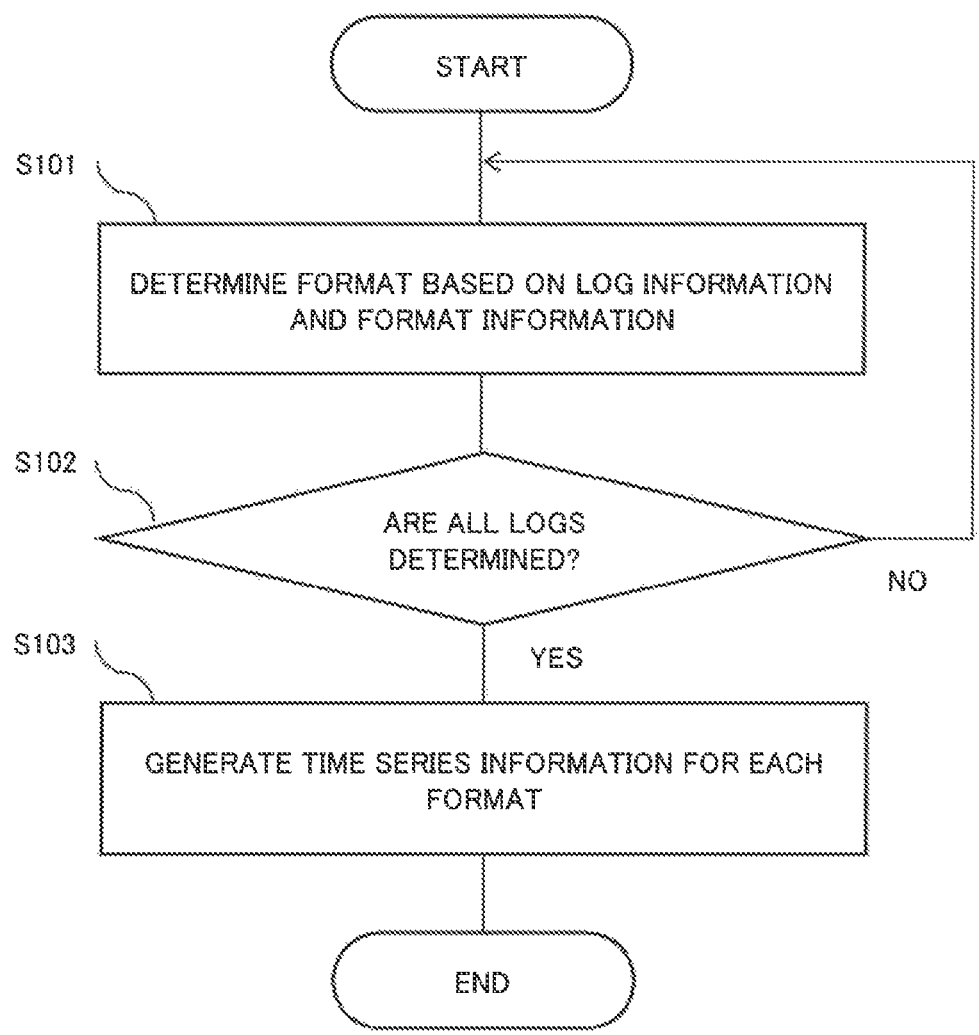

Fig. 7

| LOG DATA | PATTERN ID |
|---|---|
| ... | ... |
| 2015/08/17 08:21:37 [SV008] JNW 3258 HAS STARTED | 039 |
| 2015/08/17 08:21:59 [SV003] CPU USAGE RATE HAS EXCEEDED THRESHOLD [192.168.1.23] | 223 |
| 2015/08/17 08:23:18 [SV007] JNW 082 HAS STARTED | 039 |
| 2015/08/17 08:25:37 [SV004] REQUEST TO SV003 HAS TIMED OUT | 585 |
| 2015/08/17 08:26:16 [SV001] JNW 529 HAS ENDED | 071 |
| 2015/08/17 08:26:30 [SV004]REQUEST TO SV003 HAS TIMED OUT | 585 |
| 2015/08/17 08:26:37 [SV008] JNW 3258 HAS ENDED | 071 |
| 2015/08/17 08:27:12 [SV004] REQUEST TO SV003 HAS TIMED OUT | 585 |
| 2015/08/17 08:35:01 [SV007] JNW 082 HAS ENDED | 071 |
| 2015/08/17 08:35:01 [PF] ABNORMALITY HAS OCCURRED IN ALIVE MONITORING [172.13.1.58] | 144 |
| ... | |

Fig. 8

| TIME | ... | 039 | ... | 071 | ... | 144 | ... | 223 | ... | 585 | ... |
|---|---|---|---|---|---|---|---|---|---|---|---|
| ... | ... | ... | ... | ... | ... | ... | ... | ... | ... | ... | ... |
| 2015/08/17 08:20:00 | ... | 2 | ... | 0 | ... | 0 | ... | 1 | ... | 0 | ... |
| 2015/08/17 08:25:00 | ... | 0 | ... | 2 | ... | 0 | ... | 0 | ... | 3 | ... |
| 2015/08/17 08:30:00 | ... | 0 | ... | 1 | ... | 1 | ... | 0 | ... | 0 | ... |
| ... | ... | ... | ... | ... | ... | ... | ... | ... | ... | ... | ... |

PATTERN ID

Fig. 9

| TIME | ... | PERFORMANCE INFORMATION | | | | | |
|---|---|---|---|---|---|---|---|
| | | CPU USAGE RATE | ... | MEMORY USAGE RATE | ... | DISK BUSY RATE | ... |
| ... | ... | ... | ... | ... | ... | ... | ... |
| 2015/08/17 08:20:00 | ... | 5 | ... | 75 | ... | 0 | ... |
| 2015/08/17 08:25:00 | ... | 2 | ... | 50 | ... | 0 | ... |
| 2015/08/17 08:30:00 | ... | 1 | ... | 75 | ... | 0 | ... |
| ... | ... | ... | ... | ... | ... | ... | ... |

Fig. 11

| FORMAT PATTERN | PERFORMANCE METRICS |
|---|---|
| PATTERN 039 | CPU USAGE RATE |

LOG ANALYSIS DEVICE, LOG ANALYSIS METHOD, AND RECORDING MEDIUM STORING PROGRAM

CROSS REFERENCE TO RELATED APPLICATIONS

This application is a National Stage of International Application No. PCT/JP2017/011102 filed Mar. 21, 2017, claiming priority based on Japanese Patent Application No. 2016-067122 filed Mar. 30, 2016, the disclosure of which is incorporated herein in its entirety by reference.

TECHNICAL FIELD

The present invention relates to a log analysis device and the like for analyzing a log.

BACKGROUND ART

In a system to be executed on a computer, a log including a result of an event, a message, or the like is output. When an abnormality occurs in the system or the like, a user (e.g., an operator) analyzes and assays the output log, and thereby specifies a cause of the abnormality.

In the case of analyzing a log in order to, for example, probe into a cause of an abnormality in a system, a user needs to refer to a large number of logs output from the system. In order to reduce a burden on the user, there is a demand for providing information to assist the analysis based on logs.

PTL 1 discloses a technique for loading a log of a monitoring target host, acquiring performance information in a log having a change, when the log is changed, based on a log transition model in a normal situation and information about the loaded log, and determining whether or not a failure occurs based on the acquired performance information and log information.

In addition, PTL 2 discloses a technique for outputting logs for each of software configuration and hardware configuration of a monitored target, based on a definition in which the software configuration and the hardware configuration are associated with each other based on log characteristics for each of the software configuration and the hardware configuration of the monitored target.

CITATION LIST

Patent Literature

[PTL 1] Japanese Unexamined Patent Application Publication No. 2014-120001
[PTL 2] Japanese Unexamined Patent Application Publication No. 2010-86099

SUMMARY OF INVENTION

Technical Problem

In the technique disclosed in PTL 1, whether or not a failure is present in the monitoring host is determined based on the log information. In the technique disclosed in PTL 2, logs output from the monitored target are output for each predetermined category. However, in order to estimate a cause of a failure in a system (monitoring host) that outputs log information, it is necessary for a user such as an analyst or an operator to analyze the log information, based on the user's know-how. In the techniques disclosed in PTL 1 and PTL 2, it is difficult to estimate a section that causes a failure. Since the user analyzes the cause of the failure in the system from a log, based on know-how, a load on the user is large. In other words, in the techniques disclosed in PTL 1 and PTL 2, a load on the user to analyze a section that causes a failure in the system is still large, and thus it is difficult to reduce the load on the user.

An object of the present invention is to solve the above-described problems and to provide a log analysis device and the like capable of reducing a load on a user when a cause of a failure in a system is analyzed from a log.

Solution to Problem

A log analysis device according to one aspect of the present invention includes correlation model generation means for generating a correlation model between a pattern of a log output from a monitored target in a prescribed period and the monitored target, based on time series of the pattern and an operating status of the monitored target, and determination means for determining, based on the correlation model, existence of an abnormality in the monitored target.

A log analysis method according to one aspect of the present invention includes generating a correlation model between a pattern of a log output from a monitored target in a prescribed period and the monitored target, based on time series of the pattern and an operating status of the monitored target, and determining existence of an abnormality in the monitored target, based on the correlation model.

A recording medium storing a program according to one aspect of the present invention causes a computer to execute processing of: generating a correlation model between a pattern of a log output from a monitored target in a prescribed period and the monitored target, based on time series of the pattern and an operating status of the monitored target; and determining existence of an abnormality in the monitored target, based on the correlation model.

Advantageous Effects of Invention

According to the present invention, it is possible to reduce a load on a user when a cause of a failure in a system is analyzed from a log.

BRIEF DESCRIPTION OF DRAWINGS

FIG. 4 is a diagram illustrating an example of log information stored in a log information storage unit according to the first example embodiment;
FIG. 5 is a diagram illustrating an example of format information stored in a format storage unit according to the first example embodiment;
FIG. 6 is a flowchart illustrating an operation example of a log analysis unit according to the first example embodiment;
FIG. 7 is a diagram illustrating an example of determined log information according to the first example embodiment;

FIG. 8 is a diagram illustrating an example of log time series information according to the first example embodiment;

FIG. 9 is a diagram illustrating an example of performance information according to the first example embodiment;

FIG. 11 is a diagram illustrating an example of output information according to the first example embodiment;

EXAMPLE EMBODIMENT

Figure 1:
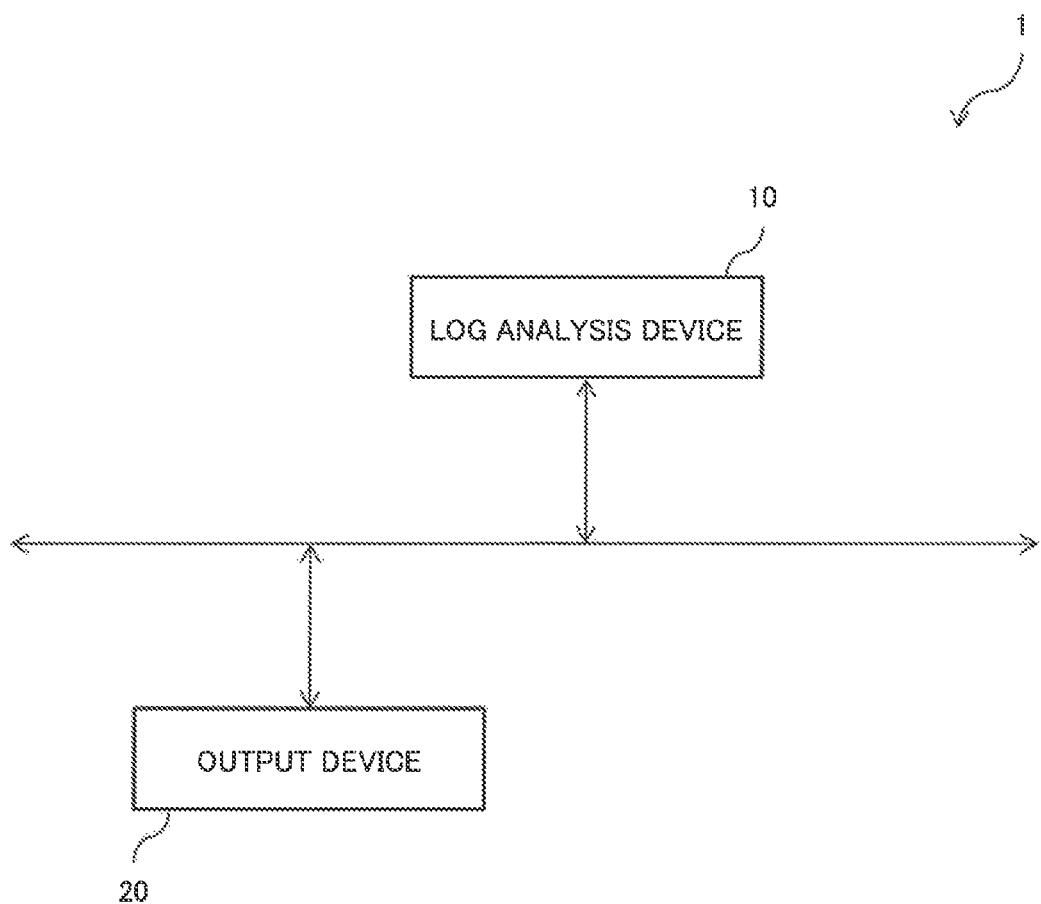
FIG. 1 is a diagram illustrating an operation form of a log analysis system according to a first example embodiment.

Example embodiments of the present invention will be described below with reference to the drawings. However, the present invention is not limited to the example embodiments. Note that in the drawings described below, components having the same functions are denoted by the same reference numerals and repeated descriptions thereof are omitted as needed.

The present example embodiment illustrates, by way of example, a log analysis device (information processing device) that generates a correlation model between a pattern of a log output from an object to be a monitored target and the monitored target, based on time series of the pattern and an operating status of the monitored target, and determines existence of an abnormality in the monitored target by using the generated correlation model.

FIG. 1 is a diagram illustrating an example of an operation form of a log analysis system 1 according to a first example embodiment. As illustrated in FIG. 1, the log analysis system 1 according to the present example embodiment has a configuration in which a log analysis device 10 and an output device 20 are connected via a network such as the Internet or a local area network (LAN).

The log analysis device 10 is an information processing device, such as a personal computer (PC), which generates a correlation model between a pattern of a log and an operating status of a monitored target, analyzes a log to be inspected and the operating status by using the generated correlation model, and outputs an analysis result. Information to be output by the log analysis device 10 is hereinafter referred to as "output information". Note that the log analysis system 1 may use a log analysis device 11, which is described below, in place of the log analysis device 10. The log analysis devices 10 and 11 will be described in detail below.

The output device 20 is an interface for a user who uses the log analysis system 1 according to the present example embodiment, and is implemented in such a manner that a software program for implementing a Graphical User Interface (GUI) or the like is installed in a PC having a general information-processing-function. Note that the output device 20 may be an information processing device, such as a tablet terminal or a wearable terminal, which performs display of the output information output from the log analysis device 10 or the like.

Figure 2:
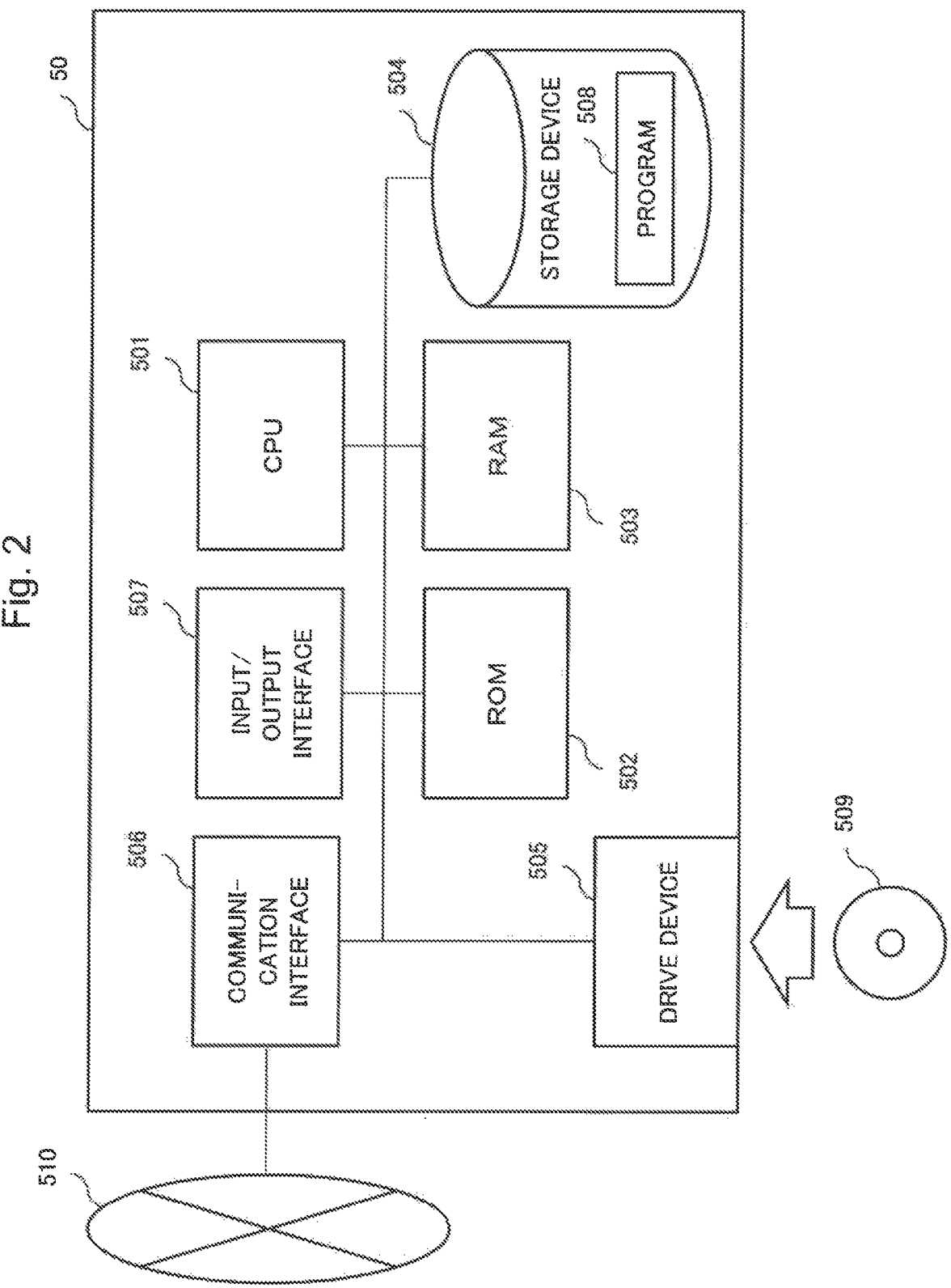
FIG. 2 is a block diagram illustrating a hardware configuration of a computer device that implements a log analysis device and the like according to the present example embodiment.

Next, hardware constituting each device of the log analysis device 10 and the output device 20 included in the log analysis system 1 according to the present example embodiment will be described. FIG. 2 is a block diagram illustrating a hardware configuration of a computer device 50 for implementing the log analysis device 10 or the output device 20 according to the present example embodiment.

As illustrated in FIG. 2, the computer device 50 includes a central processing unit (CPU) 501, a read only memory (ROM) 502, a random access memory (RAM) 503, a storage device 504, a drive device 505, a communication interface 506, and an input/output interface 507.

The CPU 501 executes a program 508 by using the RAM 503. The program 508 may be stored in the ROM 502. Further, the program 508 may be recorded on a recording medium 509, may be read out by the drive device 505, or may be transmitted from an external device via a network 510. The communication interface 506 exchanges data with the external device via the network 510. The input/output interface 507 exchanges data with a peripheral device (such as a keyboard, a mouse, and a display device). The communication interface 506 and the input/output interface 507 can function as a means for acquiring or outputting data. Data such as output information may be stored in the storage device 504, or may be included in the program 508.

Figure 10:
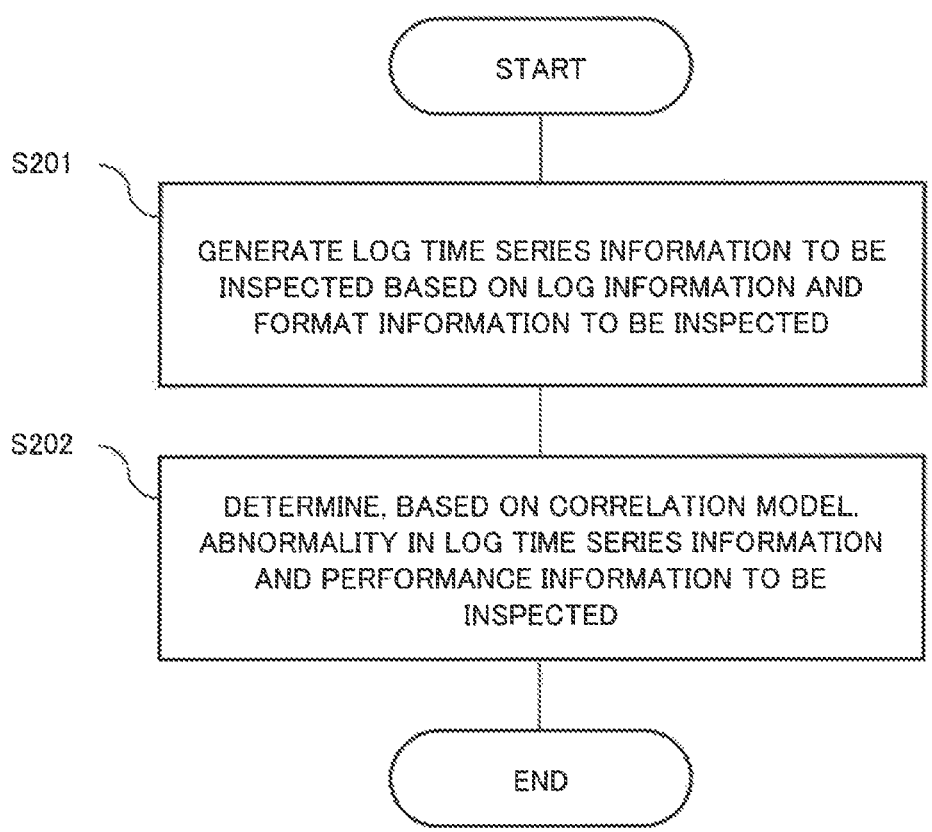
FIG. 10 is a flowchart illustrating an operation example of an abnormality determination unit according to the first example embodiment.
Figure 12:
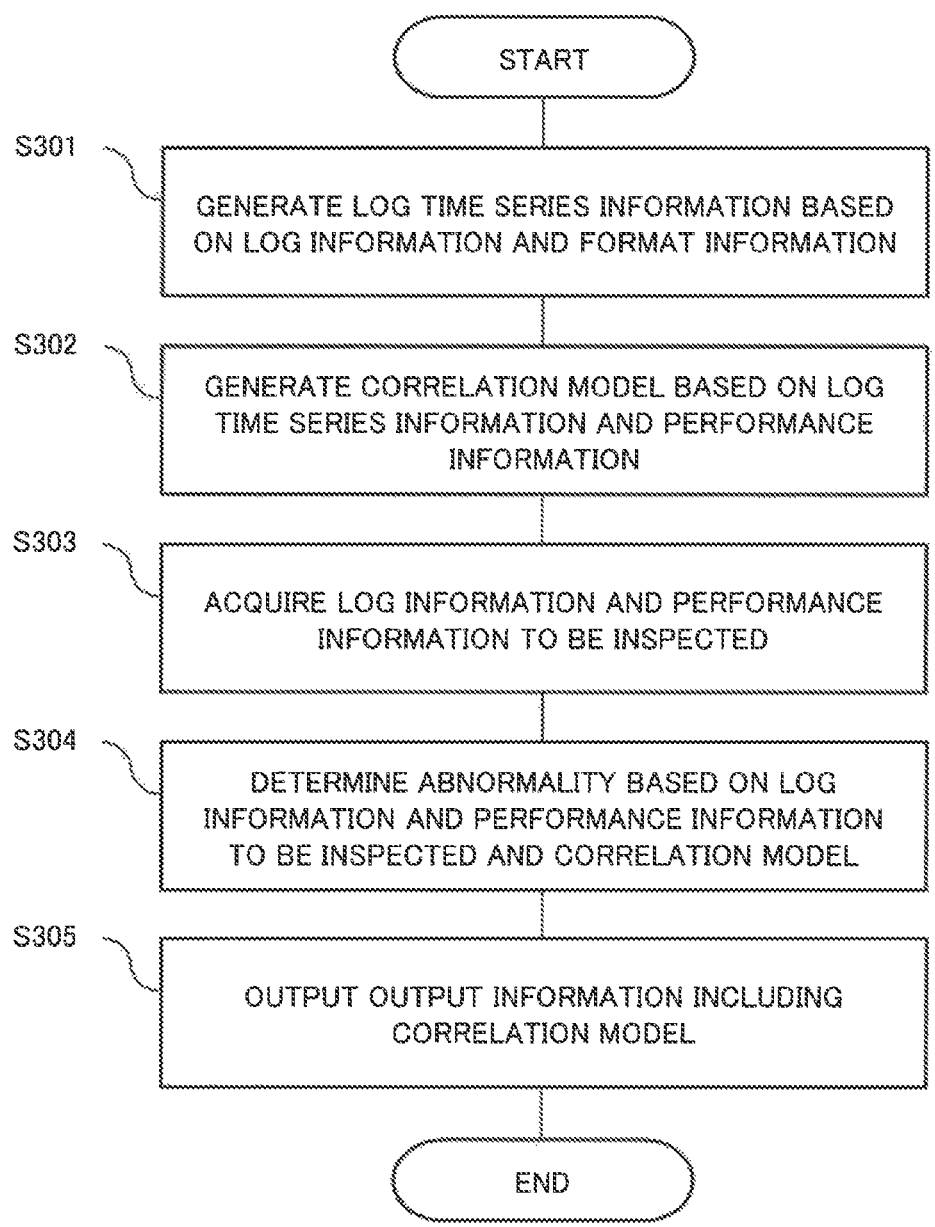
FIG. 12 is a flowchart illustrating an operation example of a log analysis device according to the first example embodiment.

Note that a processing method for recording, on a recording medium, a program for operating configurations of the following example embodiments in such a way as to implement functions of the example embodiments (more specifically, a program for causing a computer to execute processing illustrated in FIGS. 6, 10, 12, and the like), reading out the program recorded on the recording medium as a code, and causing a computer to execute the processing method is also included within the scope of each example embodiment. In other words, a computer-readable recording medium is also included within the scope of each example embodiment. Not only the recording medium recording the program as described above, but also the program itself is included within each example embodiment.

As the recording medium, for example, a floppy (registered trademark) disk, a hard disk, an optical disk, a magneto-optical disk, a Compact Disc (CD)-ROM, a magnetic tape, a nonvolatile memory card, or a ROM can be used. Not only a method for executing processing by using only the program recorded on the recording medium, but also a method for executing processing by operating the program on an OS in cooperation with other pieces of software or expansion board functions are included within the scope of each example embodiment.

First Example Embodiment

Figure 3:
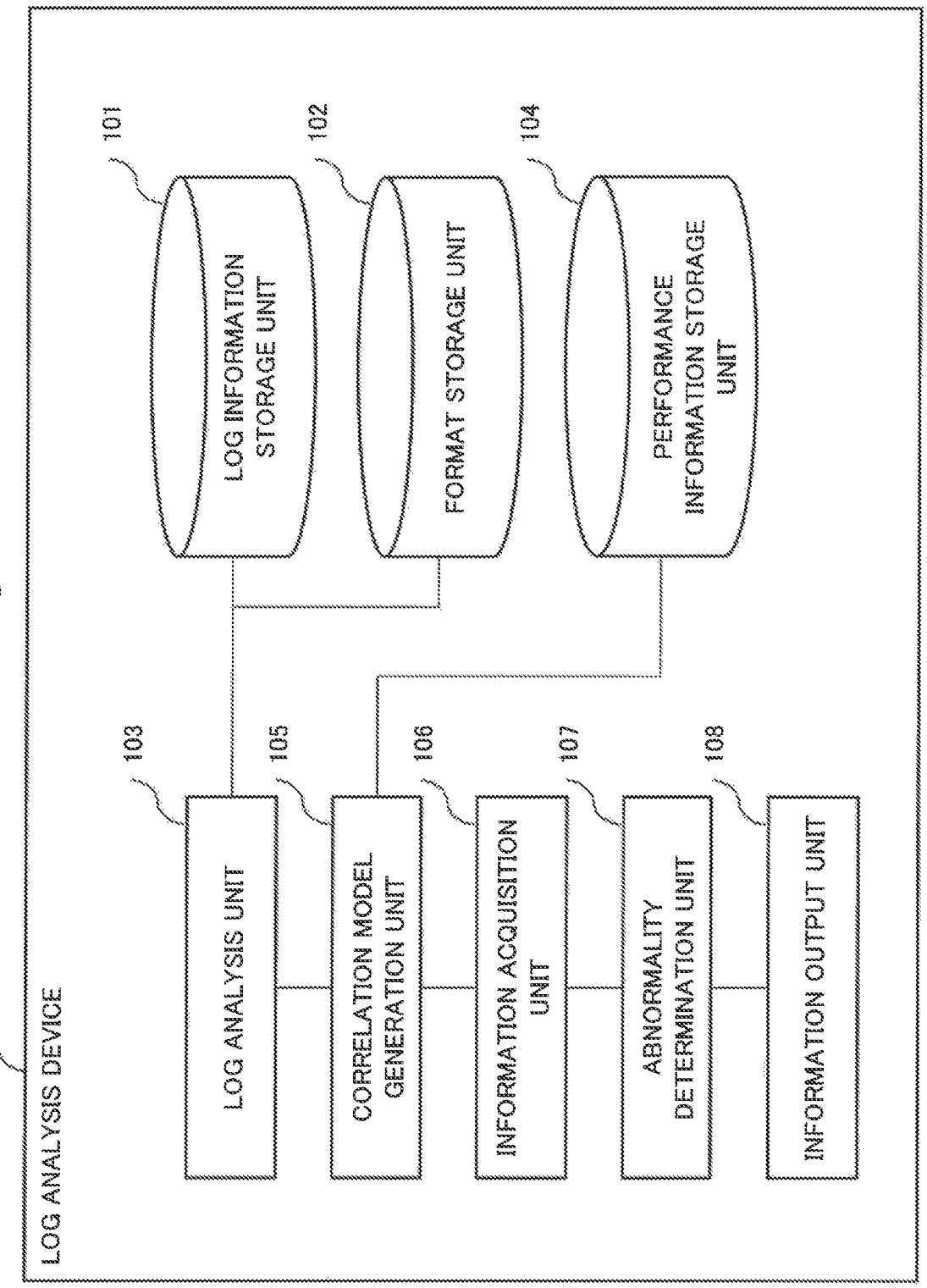
FIG. 3 is a block diagram illustrating a functional configuration of the log analysis device according to the first example embodiment.

Next, functions of the log analysis device 10 according to the present example embodiment will be described. FIG. 3 is a block diagram illustrating a functional configuration of the log analysis device 10 according to the first example embodiment. Blocks illustrated in FIG. 3 may be mounted in a single device, or may be mounted separately in a plurality of devices. Data may be exchanged between blocks via any means such as a data bus, a network, or a portable recording medium.

As illustrated in FIG. 3, the log analysis device 10 according to the present example embodiment includes a log information storage unit 101, a format storage unit 102, a log analysis unit 103, a performance information storage unit 104, a correlation model generation unit 105, an information acquisition unit 106, an abnormality determination unit 107, and an information output unit 108.

The log information storage unit 101 stores log information obtained from a system of the monitored target. An example of the log information storage unit 101 includes a storage device such as a memory or a hard disk. The system of the monitored target is, for example, an Information Technology (IT) system. The IT system is composed of a device (e.g., a server, a client terminal, a network device, or other information devices) or software operating on the device, such as a system software or application software.

As illustrated in FIG. 4, the log information includes a plurality of logs (log data). FIG. 4 is a diagram illustrating an example of the log information stored in the log information storage unit 101 according to the first example embodiment. In the example illustrated in FIG. 4, one log included in the log information indicates "2015/08/17 08:21:37 [SV008] JNW 3258 has started.".

Note that the log information includes a log recording a content of an event occurring during operation, a status during operation, and the like. The log information may also include, for example, a log represented in any data format (file format), such as binary data or text data. Further, the log information may be stored in the log information storage unit 101 as a database table or a text file. Further, the log information is added and updated as needed or periodically to the log information storage unit 101.

Note that the log information storage unit 101 according to the present example embodiment stores, for example, log information during a period in which the system of the monitored target is normally operated.

The format storage unit 102 stores format information. An example of the format storage unit 102 includes a storage device such as a memory or a hard disk. The format information is a pattern of a format indicating a log representation format. For example, when a plurality of logs, such as "Process p325 start", "Process p223 start", and "Process p234 start", are output, it is estimated that there is a format pattern composed of a constant portion and a variable portion such as "Process <variable> start", which is common to these logs. The variable portion is a portion that can vary in the format pattern. The variable portion in the format pattern described above is represented by "<variable>". The constant portion is a portion that does not vary in the format pattern. The constant portion in the format pattern described above is represented by "Process" and "start". The format storage unit 102 stores format information including one or more format patterns.

As illustrated in FIG. 5, in the format information, a format pattern is associated with a pattern ID which is an identifier for the format pattern. FIG. 5 is a diagram illustrating an example of format information stored in the format storage unit 102 according to the first example embodiment. In the example illustrated in FIG. 5, the format pattern with a pattern ID "039" indicates "<variable: time stamp>[<variable: character string>] JNW <variable: value> has started.".

The log analysis unit 103 generates time series information for each log format (hereinafter also referred to as "log time series information") based on log information and format information. Specifically, the log analysis unit 103 refers to logs included in the log information and format patterns included in the format information, and generates log time series information indicating how many logs corresponding to the respective format patterns appear within a certain period of time.

A processing performed by the log analysis unit 103 will be described in detail below. The processing is to generate log time series information. FIG. 6 is a flowchart illustrating an operation example of the log analysis unit 103 according to the first example embodiment.

The log analysis unit 103 determines formats for logs based on the log information stored in the log information storage unit 101 and the format information stored in the format storage unit 102 (step S101). As illustrated in FIG. 7, the log analysis unit 103 determines which one of the format patterns in the format information illustrated in FIG. 5 corresponds to the log information illustrated in FIG. 4. FIG. 7 is a diagram illustrating an example of the determined log information according to the first example embodiment. For example, in the example illustrated in FIG. 4, the log information indicates "2015/08/17 08:21:37 [SV008] JNW 3258 has started". When format information is the information illustrated in FIG. 5, the log analysis unit 103 determines the information indicating "2015/08/17 08:21:37 [SV008] JNW 3258 has started." as illustrated in FIG. 7 to correspond to the pattern ID "039".

Note that the "pattern ID" row indicated in the log information obtained after the pattern determination illustrated in FIG. 7 is pattern IDs for format patterns respectively corresponding to the logs in the respective rows.

When determining all logs (Yes in step S102), the log analysis unit 103 generates log time series information based on the determined log information (step S103). As illustrated in FIG. 8, the log analysis unit 103 classifies the logs in the determined log information for each pattern ID, and calculates an amount of appearances of the classified logs for each prescribed period. FIG. 8 is a diagram illustrating an example of the log time series information according to the first example embodiment. In the example illustrated in FIG. 8, the log time series information is expressed by a table format indicating how many times logs corresponding to the respective format patterns (pattern IDs) appear at intervals of five minutes. Specifically, for example, in the log information illustrated in FIG. 7, five minutes from 2015/08/17 08:25:00 to 2015/08/17 08:29:59 is expressed as "2015/08/17 08:25:00" by using the start time. At "2015/08/17 08:25:00", two pieces of log information corresponding to a pattern ID "071" are "2015/08/17 08:26:16 [SV001] JNW 529 has ended." and "2015/08/17 08:26:37 [SV008] JNW 3258 has ended.". In this case, as illustrated in FIG. 8, the log analysis unit 103 calculates the log time series information (the number of appearances) corresponding to the pattern ID "071" associated with "2015/08/17 08:25:00", which is the start time of the prescribed period, as "2".

Further, when the log analysis unit 103 does not determine all logs (No in step S102), the log analysis unit 103 executes processing of step S101.

Note that the log time series information may be any file format such as Comma-Separated Values (CSV), Tab-Separated Values (TSV), JavaScript (registered trademark) Object Notation (JSON).

The performance information storage unit 104 stores performance information (hereinafter also referred to as an "operating status") indicating performance metrics of the system of the monitored target. An example of the performance information storage unit 104 includes a storage device such as a memory or a hard disk. The performance metrics refer to the usage amount, the usage rate, the number of times of use, or the like of computer resources per unit time, such as, per second, minute, or five minutes. Specific examples of the performance metrics include a CPU usage rate, a memory usage amount, a disk busy rate, and a network transmission/reception amount. As illustrated in FIG. 9, the performance information is time series information about the performance metrics of the monitored target. FIG. 9 is a diagram illustrating an example of performance information according to the first example embodiment. In the example illustrated in FIG. 9, in the performance information, a time per prescribed period is associated with a value for each performance metrics in the prescribed period. Specifically, for example, as illustrated in FIG. 9, the value of the CPU usage rate that is the performance metrics associated with the start time "2015/08/17 08:25:00" of the prescribed period indicates "2".

Note that computer resources are not limited to physical resources, such as a physical CPU or a disk, but instead may be logical resources. Examples of logical resources include a logical CPU or logical disk allocated to a virtual machine, the number of network connections, the number of working threads in middleware, and the like.

Note that the time of the performance information in the present example embodiment is the same as the time of the log time series information illustrated in FIG. 8. While the present example embodiment illustrates a case where the value of performance metrics included in the performance information in the present example embodiment is indicated by actual percentage, but instead the value may be, for example, an approximate value obtained by rounding off the actual percentage, or each ratio.

The correlation model generation unit 105 generates a correlation model indicating a correlation between a log pattern and performance metrics based on the log time series information and performance information. Specifically, the correlation model generation unit 105 generates a correlation model between the amount of appearance of a log corresponding to a format pattern and the value for each performance metrics.

The correlation model will be described below by using a simple example. An equation for a correlation model for two certain variables X and Y is given as follows.

$$Y = A \cdot X + B \quad \text{(Equation 1)}$$

As shown in the above (Equation 1), assuming that the variable X is an explanatory variable, the variable Y is an objective function, and A and B represent constants, the correlation model represents, for example, a relational expression in which when one of values is determined, another of the values also is determined. Note that A or B in the above (Equation 1) is estimated by correlation analysis or regression analysis.

A calculation equation for a correlation model when assuming that the variables X and Y correspond to time series information Xi and Yi (i=0, 1, 2, . . . ), respectively, is given as follows. For example, the following (Equation 2) represents a correlation model between log time series information and performance time series information according to the present example embodiment.

$$Yi = A \cdot Xi + B \quad \text{(Equation 2)}$$

Note that the presence or absence of the correlation between the time series information Xi and Yi represented by the above (Equation 2) is determined based on, for example, whether a correlation coefficient obtained from data is equal to or more than a certain value, or whether the error, the residual sum of squares, or the like with the above (Equation 2) is equal to or less than a certain value. Further, the correlation between the time series information Xi and Yi may be estimated based on, for example, an Auto-Regressive eXogenous (ARX) model also using previous time series information Xi, Yi (i=0, . . . i−1) of Xi or Yi.

The correlation model generation unit 105 analyzes the correlation corresponding to a combination of a format pattern included in the log time series information generated by the log analysis unit 103 and performance metrics included in the performance time series information stored in the performance information storage unit 104 by using the format pattern as an explanatory variable and using the performance metrics as an objective variable, and generates, as a correlation model, a pair of the format pattern and the performance metrics which are determined to have a correlation. Specifically, for example, when a "pattern 039" representing the format pattern and a "CPU usage rate" representing the performance metrics have a correlation, the correlation model generation unit 105 generates a correlation model corresponding to "CPU usage rate-pattern 039". Specifically, the correlation model generation unit 105 generates a correlation model between a pattern of a log output from a monitored target in a prescribed period and the monitored target, based on time series of the pattern and an operating status of the monitored target.

Note that the correlation model generation unit 105 may store, for example, the generated correlation model in a storage device within the log analysis system 1. Further, the correlation model generation unit 105 according to the present example embodiment has been described above by using the format pattern as an explanatory variable and the performance metrics as an object variable, but it is not limited to this. For example, the correlation model generation unit 105 may analyze a correlation between a format pattern and performance metrics by using the format pattern as an objective variable and using the performance metrics as an explanatory variable, and may generate a correlation model. Further, the correlation model generation unit 105 may analyze a correlation by mainly using a format pattern or computer resource designated in advance.

The information acquisition unit 106 acquires log information and performance information to be inspected on the system of the monitored target (hereinafter also referred to as "log information and performance information to be inspected"). The log information and performance information to be inspected indicate log information and performance information, respectively, of the system of the monitored target as an object for which it is determined whether an abnormality is present.

Note that the information acquisition unit 106 may acquire, for example, log information and performance information in real time, or may acquire log information and performance information for a certain period at predetermined intervals. The acquired log information and performance information to be inspected may be stored in the storage device within the log analysis system 1. The information acquisition unit 106 may acquire log information and performance information by reading out the log information and performance information within a certain period that are stored in the storage device within the log analysis system 1. Further, the information acquisition unit 106 may acquire the log information and the performance information from, for example, a monitoring system that monitors the system of the monitored target. Further, log information and performance information may be acquired for a certain period by the monitoring system or the like.

The abnormality determination unit 107 determines an abnormality in the system of the monitored target based on the log information and performance information to be inspected and the correlation model. Specifically, the abnormality determination unit 107 determines an abnormality in the log time series information and performance information to be inspected based on the correlation model.

Abnormality determination processing performed by the abnormality determination unit 107 will be described in detail below. FIG. 10 is a flowchart illustrating an operation example of the abnormality determination unit 107 according to the first example embodiment. As illustrated in FIG. 10, the abnormality determination unit 107 generates log time series information to be inspected based on the log information to be inspected acquired by the information acquisition unit 106 and the format information stored in the format storage unit 102 (step S201). Processing of this step is similar to the processing of steps S101 to S103 described above.

The abnormality determination unit 107 determines an abnormality in the generated log time series information to be inspected and the performance information to be inspected acquired by the information acquisition unit 106 based on the correlation model generated by the correlation model generation unit 105 (step S202). For example, the abnormality determination unit 107 determines whether or not the log time series information and performance information to be inspected correspond to the correlation model. Specifically, the abnormality determination unit 107 determines that the log time series information and performance information to be inspected do not correspond to the correlation model (hereinafter also referred to as "the correlation is broken") when a difference between a value of an objective variable predicted from the correlation model and an actual observation value (e.g., a value of performance metrics to be inspected) is equal to or more than a certain value, with regard to the explanatory variable (e.g., an amount of appearance of the log corresponding to the format pattern) and the objective variable (e.g., a value for each performance metrics) which are considered to have a correlation in the correlation model. In other words, the abnormality determination unit 107 determines existence of an abnormality in the monitored target based on the correlation model.

Note that in the case of determining the log information and performance information within a certain period which are acquired by the information acquisition unit 106, the abnormality determination unit 107 may repeat the processing of steps S201 and S202, for example, until the determination as to all the log information and performance information within a certain period is completed.

Note that at the time of determination, the difference between the predicted value of the objective variable and the observation value depends on an average value of values that can be taken by the objective variable. For this reason, the abnormality determination unit 107 may determine an abnormality based on the value obtained by dividing (normalizing) the difference by the average value of objective variables. Further, the abnormality determination unit 107 may determine that the correlation is broken when the state where the difference between the predicted value of the objective variable and the observation value is equal to or more than a certain value continues for a certain period. Furthermore, the abnormality determination unit 107 may determine that the correlation is broken when a correlation coefficient obtained from the log information and performance information within a certain inspection target period.

The information output unit 108 outputs output information including the correlation model that is determined to have an abnormality by the abnormality determination unit 107. Specifically, for example, the information output unit 108 outputs the correlation model whose correlation is determined to be broken.

Further, the information output unit 108 outputs, for example, the output information to the output device 20. FIG. 11 is a diagram illustrating an example of the output information according to the first example embodiment. As illustrated in FIG. 11, the output information indicates a correlation model composed of the "pattern 039" which is the format pattern and the "CPU usage rate" which is the performance metrics having a correlation with the format pattern. The correlation model indicates that the correlation of the "pattern 039" with the "CPU usage rate" is broken between the log information and performance information to be inspected.

Note that the information output unit 108 may output the output information including all correlation models generated by the correlation model generation unit 105. The information output unit 108 in the status outputs, for example, the output information in which the correlation model whose correlation is broken is highlighted in boldface, diagonal lines, color, or the like among the correlation models.

Next, an operation of the log analysis device 10 according to the present example embodiment will be described. FIG. 12 is a flowchart illustrating an operation example of the log analysis device 10 according to the first example embodiment.

The log analysis unit 103 generates log time series information based on the log information stored in the log information storage unit 101 and the format information stored in the format storage unit 102 (step S301). The correlation model generation unit 105 generates a correlation model based on the log time series information generated by the log analysis unit 103 and the performance information stored in the performance information storage unit 104 (step S302). The information acquisition unit 106 acquires log information and performance information to be inspected (step S303). The abnormality determination unit 107 determines an abnormality based on the log information and performance information to be inspected that are acquired by the information acquisition unit 106 and the correlation model generated by the correlation model generation unit 105 (step S304). The information output unit 108 outputs the output information based on the determination result (step S305).

As described above, in the log analysis system 1 according to the present example embodiment, the log analysis device 10 determines an abnormality based on the correlation model obtained from log information, format information, and performance information, and based on the log information and performance information to be inspected, and outputs the output information based on the determination result to the output device 20.

Consequently, it is possible to determine an abnormality in the log and operating status to be inspected by using the generated correlation model, and output the output information including the correlation model related to the abnormality, thereby enabling a user to check an abnormality in the system of the monitored target and the correlation model related to the abnormality, which leads to a reduction in load on the user when the cause of a failure in the system is analyzed from a log. Specifically, the user can check that at least one of the format pattern and the performance metrics has an abnormality from the correlation model related to the abnormality. Further, since the user can check the format pattern and the performance metrics included in the correlation model related to the abnormality, the user can accumulate know-how on the cause of a failure in the system, which leads to a further reduction in load on the user when the cause of a failure in the system is analyzed from a log.

Figure 13:
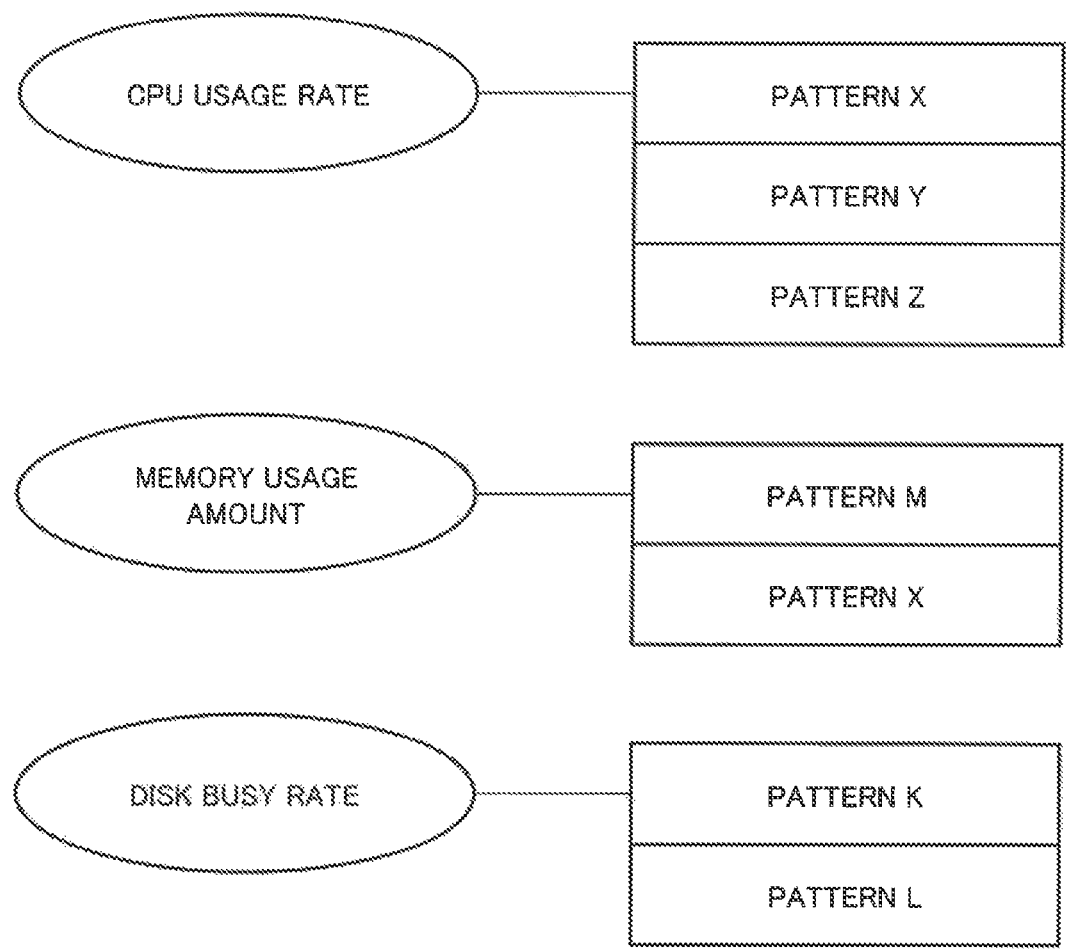
FIG. 13 is a diagram illustrating another example of the output information according to the first example embodiment.

The information output unit 108 according to the present example embodiment has been described assuming that the output information including the correlation model in which a format pattern and performance metrics are associated on one-to-one basis is output as illustrated in FIG. 11, but it is not limited to this. For example, the information output unit 108 may output the output information illustrated in FIG. 13. FIG. 13 is a diagram illustrating another example of the output information according to the first example embodiment. As illustrated in FIG. 13, in the output information of this example, the performance metrics and the format pattern are connected by a line. The line connecting the performance metrics and the format pattern indicates that the performance metrics and the format pattern have a correlation. In the example illustrated in FIG. 13, the "CPU usage rate", which is performance metrics, has a correlation with three format patterns "pattern X, pattern Y, and pattern Z". Note that the illustration of lines connecting to the patterns Y and Z are omitted.

The log analysis device 10 in this example can collectively output the correlation model whose correlation is broken for each performance metrics. Thus, the user can check the correlation model related to the abnormality for each performance metrics, which leads to a reduction in load on the user to analyze a failure.

Note that in the example illustrated in FIG. 13, the correlation is expressed by connecting a format pattern and performance metrics by a line, but instead the state where the correlation is broken may be expressed by changing the color of a line to a warning color such as red. The log analysis device 10 in this example inspects the relationship between the log information and performance information to be inspected based on the correlation model obtained from the system of the monitored target during a normal operation, thereby enabling to detect an abnormality in the system of the monitored target. Thus, it is possible to promptly grasp a sign of causing a failure in the system of the monitored target, and to accelerate the recovery from the failure by promptly starting the analysis of the failure. Furthermore, a reduction in load on the user to analyze the failure is allowed by presenting which correlation is broken.

Note that the information output unit 108 may store the output information in a database or the like, instead of outputting the output information to the output device. Further, the information output unit 108 may calculate and output the difference between the predicted value of the correlation model and the observation value, or the magnitude of collapse or destruction of the correlation.

The log analysis device 10 according to the present example embodiment has been described assuming that the log analysis device 10 determines an abnormality from the log information and performance information to be inspected based on the correlation model, and outputs the output information based on the determination result to the output device 20, but it is not limited to this. For example, the log analysis device 10 may generate a correlation model from the log information and performance information to be inspected, and may output the output information including the generated correlation model to the output device 20. Specifically, for example, the log analysis device 10 in this example outputs the output information including a normal correlation model, which is summarized by performance metrics as illustrated in FIG. 13. Thus, it is possible to generate a correlation model representing a correlation between a format pattern of a log and performance metrics that is useful for analyzing the cause of a failure in the system of the monitored target from a large amount of log information or performance information, and to provide the user with the generated correlation model. For example, the provision of the correlation between the format pattern "Process <variable> start" and the CPU usage rate enables the user who has little knowledge about the content of processing for a system to be analyzed to recognize that the CPU resource is consumed by the process. Further, when the CPU usage rate is unexpectedly high or low, it can be determined that an abnormality has occurred in a process indicated by a log, which leads to a further reduction in load on the user when the cause of a failure in the system is analyzed from the log.

Second Example Embodiment

Figure 14:
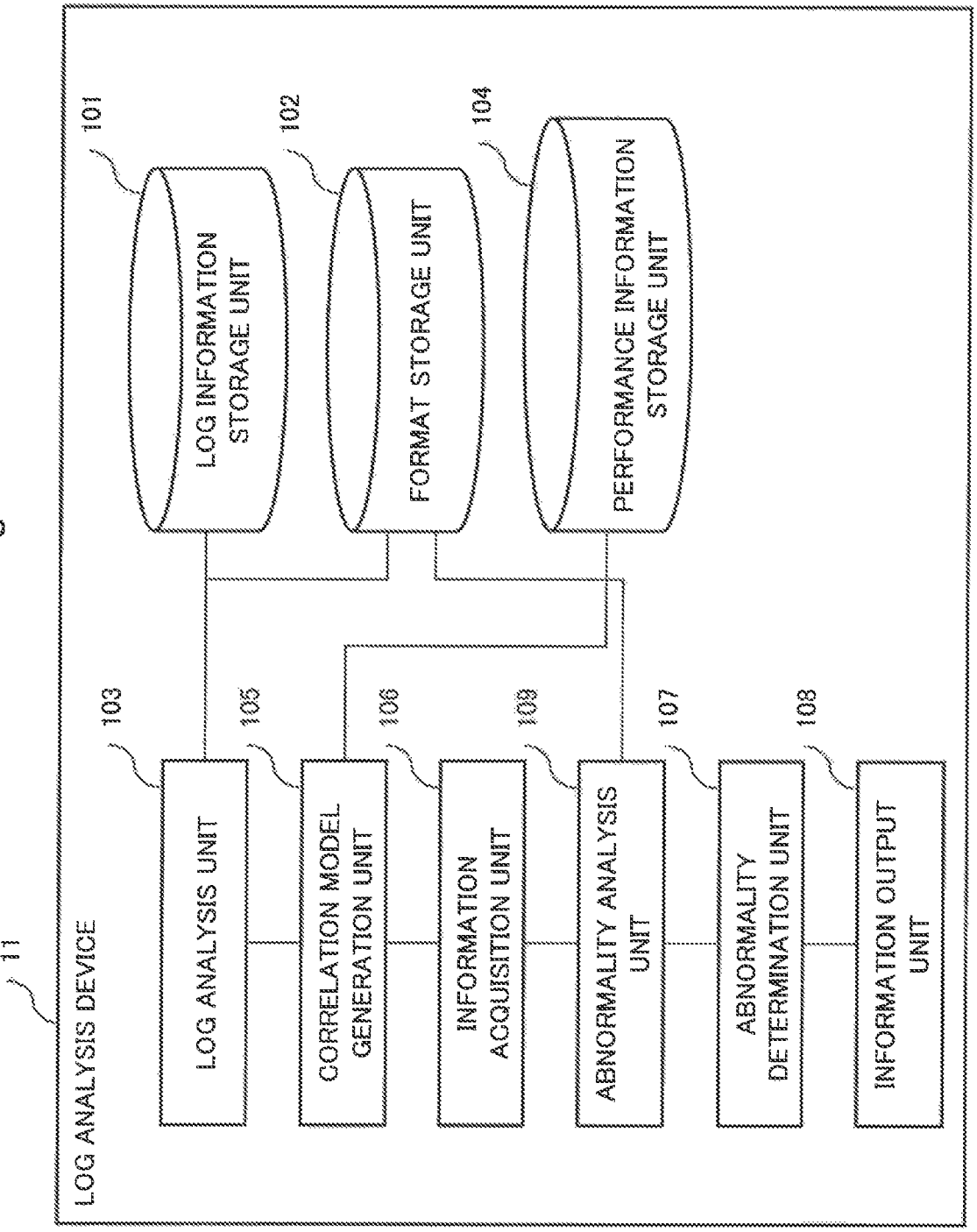
FIG. 14 is a block diagram illustrating a functional configuration of a log analysis device according to a second example embodiment.

Next, a second example embodiment will be described. While in the first example embodiment, an abnormality is determined based on the generated correlation model and the log information and performance information to be inspected, an abnormality is analyzed based on format information and log information to be inspected in the present example embodiment. Functions of a log analysis device 11 according to the present example embodiment will be described. FIG. 14 is a block diagram illustrating a functional configuration of the log analysis device 11 according to the second example embodiment. As illustrated in FIG. 14, the log analysis device 11 according to the present example embodiment includes an abnormality analysis unit 109 in addition to the configuration of the log analysis device 10 according to the first example embodiment. Repeated descriptions of the components described above are omitted as needed.

The abnormality analysis unit 109 analyzes an abnormality based on the format information stored in a format storage unit 102 and the log information to be inspected acquired by an information acquisition unit 106. Specifically, the abnormality analysis unit 109 analyzes that an abnormality is present in the log in which the log information to be inspected does not match a format pattern.

Figure 15:
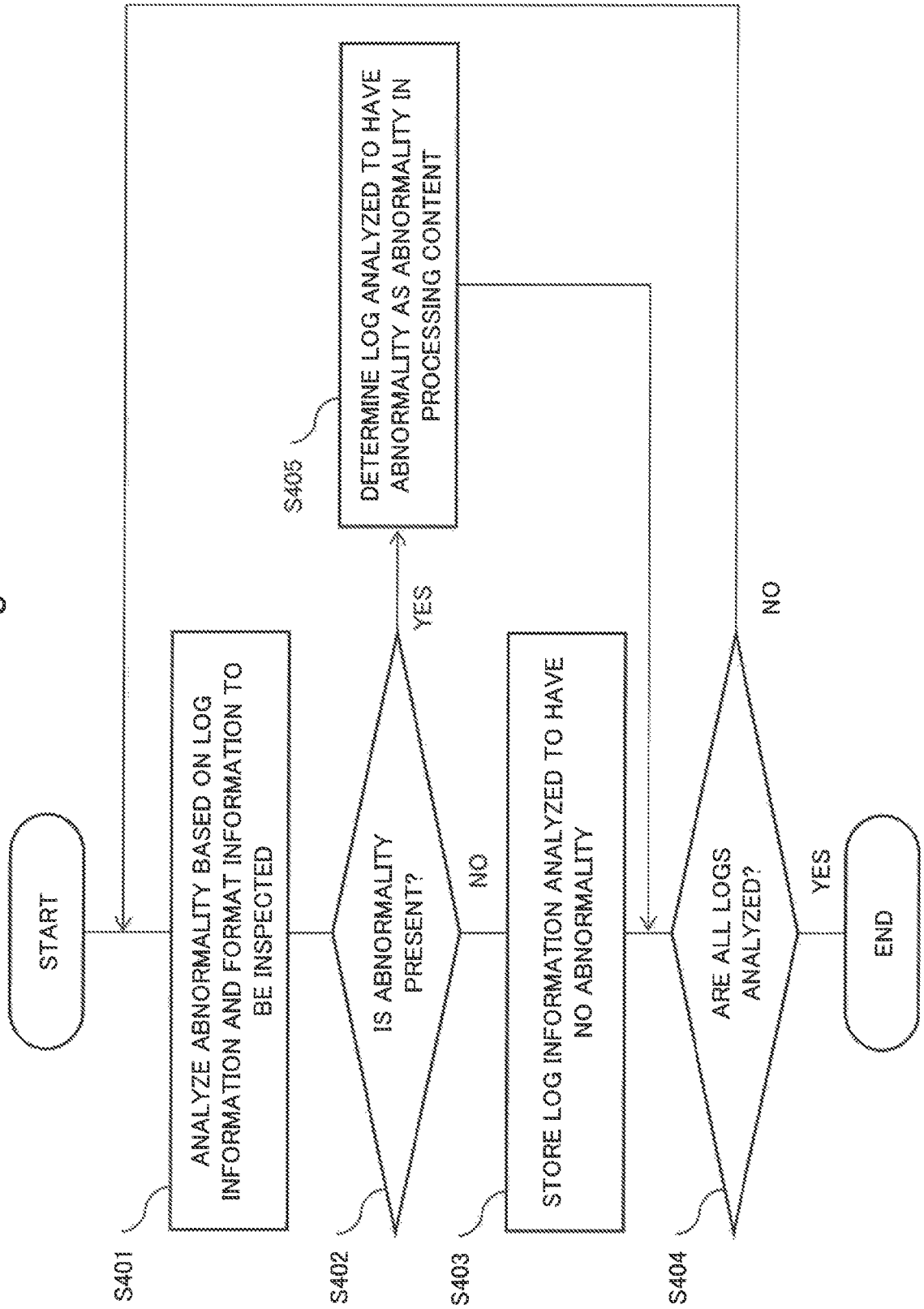
FIG. 15 is a flowchart illustrating an operation example of an abnormality analysis unit according to the second example embodiment.

Abnormality analysis processing performed by the abnormality analysis unit 109 will be described in detail below. FIG. 15 is a flowchart illustrating an operation example of the abnormality analysis unit 109 according to the second example embodiment. As illustrated in FIG. 15, the abnormality analysis unit 109 analyzes an abnormality based on the log information to be inspected acquired by the information acquisition unit 106 and the format information stored in the format storage unit 102 (step S401). Specifically, the abnormality analysis unit 109 analyzes that an abnormality is present in a log in which the log information to be investigated does not match the format pattern of the format information. When it is analyzed that no abnormality is present in step S401 (No in step S402), the abnormality analysis unit 109 stores the log information to be inspected that is analyzed to have no abnormality in a storage device within a log analysis system 1 (step S403). When all logs are analyzed (Yes in step S404), the abnormality analysis unit 109 completes the processing.

Further, when the abnormality analysis unit 109 does not analyze all logs (No in step S404), the abnormality analysis unit 109 executes processing of step S401. When the abnormality analysis unit 109 analyzes that an abnormality is present in step S401 (Yes in step S402), the abnormality analysis unit 109 determines the log analyzed to have an abnormality as an abnormality in the processing content of the system of the monitored target (step S405), and executes processing of step S404. Specifically, for example, when the log information includes an unknown log, such as "Process . . . down" or "Process . . . restart", which represents abnormal termination of a process that is not present in the log pattern, or restart of the process, the abnormality analysis unit 109 analyzes that an abnormality occurs in the processing in the of the monitored target.

Note that when the abnormality analysis unit 109 analyzes that an abnormality is present in step S401 (Yes in step S402), the abnormality analysis unit 109 outputs abnormality information about the abnormality in the determined processing content to an output device 20.

An abnormality determination unit 107 determines an abnormality in the system of the monitored target based on the log information and performance information to be inspected and the correlation model stored in the storage device within the log analysis system 1 in step S403 described above. Specifically, the abnormality determination unit 107 determines the correlation model corresponding to the log time series information or performance information related to the abnormality based on the log time series information and performance information to be inspected and the correlation model. Processing by the abnormality determination unit 107 according to the present example embodiment is similar to the processing (steps S201 to S204) by the abnormality determination unit 107 according to the first example embodiment.

In the case of determining that an abnormality is present, the abnormality determination unit 107 determines that the abnormality is present in processing resource of the system of the monitored target. In the status, since the abnormality analysis unit 109 determines that no abnormality is present in the stored log information to be inspected, the abnormality determination unit 107 determines that no abnormality is present in the processing itself. Specifically, for example, the abnormality determination unit 107 determines that it is highly likely that an abnormality is present in the usage amount, the usage rate, the number of times of use, or the like of computer resource used for processing in which a state where the correlation between the log pattern and performance metrics is broken is indicated by a log pattern.

Like the information output unit 108 according to the first example embodiment, an information output unit 108 outputs the output information. Further, when the analysis result indicates an abnormality, the information output unit 108 outputs the output information including notification information indicating that an abnormality is present in the processing content of the system of the monitored target. Further, when the determination result indicates an abnormality, the information output unit 108 outputs the output information including notification information indicating that an abnormality is present in the processing resource of the system of the monitored target.

Figure 16:
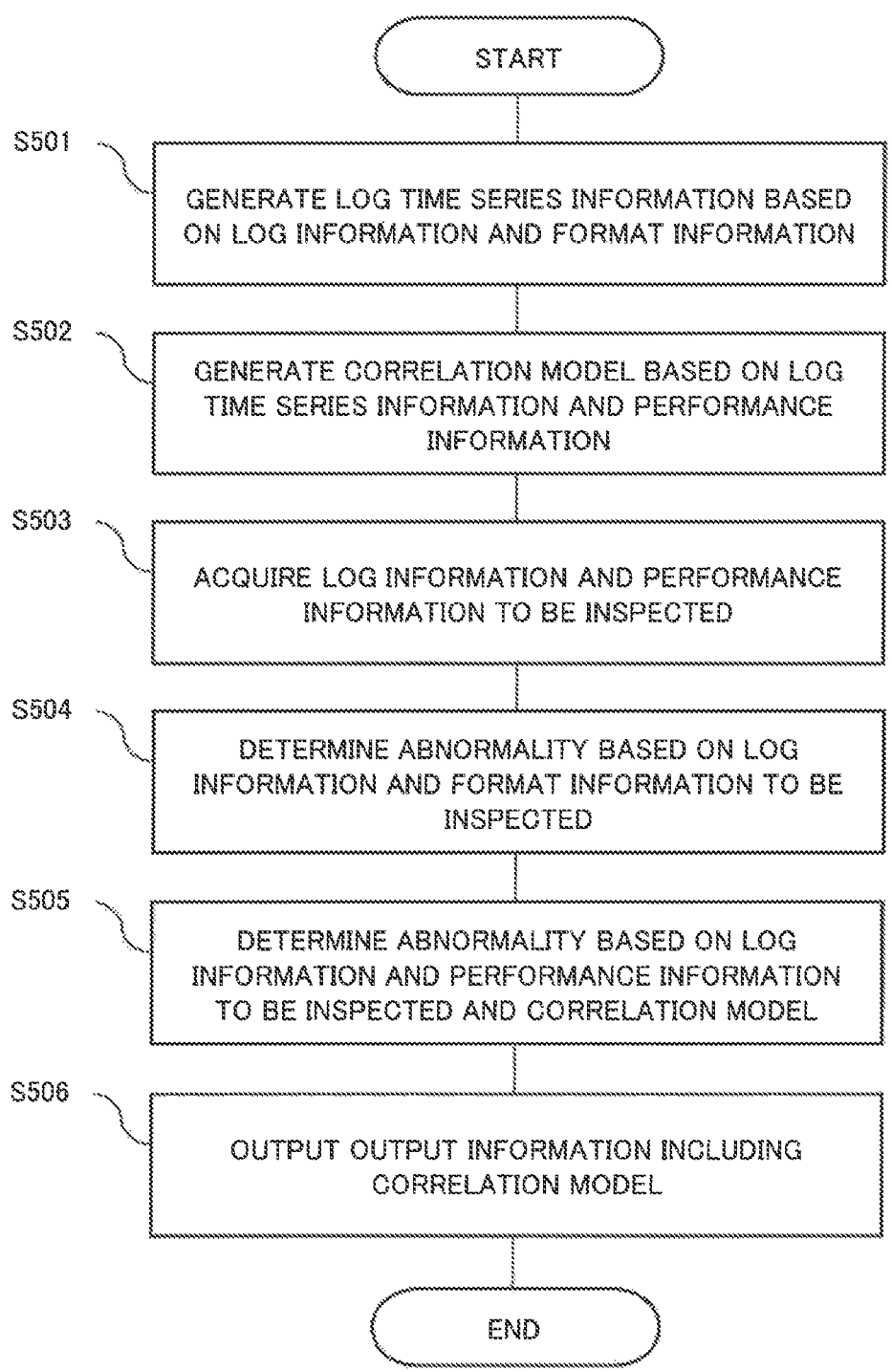
FIG. 16 is a flowchart illustrating an operation example of the log analysis device according to the second example embodiment.

Next, an operation of the log analysis device 11 according to the present example embodiment will be described. FIG. 16 is a flowchart illustrating an operation example of the log analysis device 11 according to the second example embodiment. Processing (steps S501 to S503) by the log analysis device 11 according to the present example embodiment is similar to the processing (steps S301 to S303) by the log analysis device 10 according to the first example embodiment, and thus the descriptions thereof are omitted.

The abnormality analysis unit 109 analyzes an abnormality based on the log information to be inspected acquired by the information acquisition unit 106 and the format information stored in the format storage unit 102 (step S504).

The abnormality determination unit 107 determines an abnormality based on the log information and performance information to be inspected stored in the storage device within the log analysis system 1 and the correlation model generated by a correlation model generation unit 105 (step S505). The information output unit 108 outputs the output information based on the analysis result and the determination result (step S506).

As described above, the log analysis system 1 according to the present example embodiment analyzes an abnormality based on the log information and performance information to be inspected, the format information, and the generated correlation model, determines the abnormality, and outputs the output information based on the analysis result and the determination result to the output device 20.

Thus, it is possible to analyze an abnormality based on log information to be inspected, and to determine the abnormality based on a collapse of the correlation between the format pattern and the performance metrics, thereby making it possible to sort causes for an abnormality in the system and reduce a load on the user to analyze a failure.

Other Example Embodiments

Figure 17:
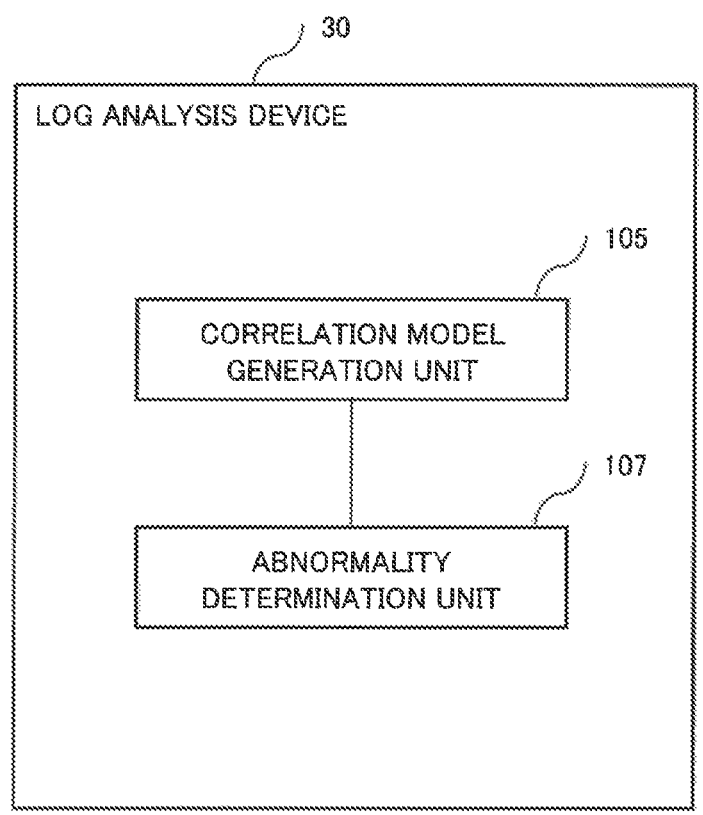
FIG. 17 is a block diagram illustrating a log analysis device according to each of the example embodiments.

FIG. 17 is a schematic configuration diagram of a log analysis device 30 according to each of the example embodiments described above. FIG. 17 illustrates a configuration example in which the log analysis device 30 functions as a device that generates a correlation model between a pattern of a log output from a monitored target in a prescribed period and the monitored target, based on time series of the pattern and an operating state of the monitored target, and determines existence of an abnormality in the monitored target based on the correlation model. The log analysis device 30 includes a correlation model generation unit 105 that generates a correlation model between a pattern of a log output from a monitored target in a prescribed period and the monitored target based on time series of the pattern and an operating status of the monitored target, and a abnormality determination unit 107 that determines existence of an abnormality in the monitored target based on the correlation model.

The present invention is not limited to the example embodiments described above and can be modified as appropriate without departing from the scope of the present invention.

The whole or part of the example embodiments described above can be described as, but not limited to, the following supplementary notes.

Supplementary Note 1

A log analysis device including:

a correlation model generation unit that generates a correlation model between a pattern of a log output from a monitored target in a prescribed period and the monitored target, based on time series of the pattern and an operating status of the monitored target; and a determination unit that determines, based on the correlation model, existence of an abnormality in the monitored target.

Supplementary Note 2

The log analysis device according to Supplementary note 1, in which the determination unit determines existence of an abnormality in the monitored target, based on whether a relationship between a pattern of a log to be inspected of the monitored target and an operating status to be inspected of the monitored target corresponds to the correlation model.

Supplementary Note 3

The log analysis device according to Supplementary note 2, further including an output unit that outputs a correlation model related to a pattern of the log to be inspected in the correlation model when a result of the determination indicates an abnormality.

Supplementary Note 4

The log analysis device according to Supplementary note 3, in which the output unit outputs, in a manner associated with an operating status, a correlation model when the result of determination indicates an abnormality.

Supplementary Note 5

The log analysis device according to any one of Supplementary notes 2 to 4, further including an analysis unit that analyzes existence of an abnormality in the monitored target based on the log to be inspected and a pattern of a plurality of predetermined logs.

Supplementary Note 6

The log analysis device according to Supplementary note 5, in which the output unit outputs a first abnormality when the result of analysis indicates an abnormality, and the output unit outputs a second abnormality when the result of determination indicates an abnormality.

Supplementary Note 7

The log analysis device according to any one of Supplementary notes 1 to 6, in which the determination unit determines existence of an abnormality based on whether or not an operating status based on the correlation model and the operating status to be inspected are included in a predetermined range.

Supplementary Note 8

The log analysis device according to any one of Supplementary notes 1 to 7, in which the correlation model generation unit generates a correlation model between a pattern of the log and the operating status when a variation in time series of the pattern and a variation in the operating status are included in a predetermined range.

Supplementary Note 9

The log analysis device according to any one of Supplementary notes 1 to 8, in which the output unit outputs the correlation model.

Supplementary Note 10

A log analysis method including:
generating a correlation model between a pattern of a log output from a monitored target in a prescribed period and the monitored target, based on time series of the pattern and an operating status of the monitored target; and
determining existence of an abnormality in the monitored target based on the correlation model.

Supplementary Note 11

A program for causing a computer to execute processing including:
generating a correlation model between a pattern of a log output from a monitored target in a prescribed period and the monitored target based on time series of the pattern and an operating status of the monitored target; and
determining existence of an abnormality in the monitored target based on the correlation model.

Supplementary Note 12

A log analysis device including:
a time series generation unit that generates time series of a pattern of a log output from a monitored target in a prescribed period based on the log and a pattern of a plurality of predetermined logs; and
a correlation model generation unit that generates a correlation model between a pattern of the log and the monitored target, based on time series of the pattern and an operating status of the monitored target in the prescribed period.

Supplementary Note 13

A log analysis method including:
generating time series of a pattern of a log output from a monitored target in a prescribed period based on the log and a pattern of a plurality of predetermined logs; and
generating a correlation model between a pattern of the log and the monitored target based on time series of the pattern and an operating status of the monitored target in the prescribed period.

Supplementary Note 14

A program for causing a computer to execute processing including:
generating time series of a pattern of a log output from a monitored target in a prescribed period based on the log and a pattern of a plurality of predetermined logs; and
generating a correlation model between a pattern of the log and the monitored target based on time series of the pattern and an operating status of the monitored target in the prescribed period.

Supplementary Note 15

A log analysis method for generating a correlation model between a pattern of a plurality of predetermined logs and performance metrics included in performance information, based on a pattern of the logs, and log information and performance information to be inspected.

The present invention has been described above with reference to example embodiments described above as exemplary examples. However, the present invention is not limited to the example embodiments described above. In other words, the present invention can be applied to various modes that can be understood by those skilled in the art within the scope of the present invention.

REFERENCE SIGNS LIST

1 Log analysis system
10, 11, 30 Log analysis device
20 Output device
50 Computer device
101 Log information storage unit
102 Format storage unit
103 Log analysis unit
104 Performance information storage unit
105 Correlation model generation unit
106 Information acquisition unit
107 Abnormality determination unit
108 Information output unit
109 Abnormality analysis unit
501 CPU
502 ROM
503 RAM
504 Storage device
505 Drive device
506 Communication interface
507 Input/output interface
508 Program
509 Recording medium
510 Network

The invention claimed is:

1. A log analysis device comprising:
at least one memory storing instructions; and
at least one processor configured to execute the instructions to:
generate a correlation model based on a format pattern of log time series information output from a monitored target in a prescribed period and an operating status indicating time series performance information of the monitoring target;
based on the correlation model, acquire a log to be inspected and an operating status to be inspected of the monitored target among the log time series information and the time series performance information, for a predetermined period at a predetermined interval; and
determine, based on the correlation model, an existence of an abnormality in the monitored target.

2. The log analysis device according to claim 1,
the at least one processor configured to execute the instructions to:
determine the existence of the abnormality in the monitored target based on whether or not a relationship between a format pattern of the log to be inspected of the monitored target and the operating status to be inspected of the monitored target corresponds to the correlation model.

3. The log analysis device according to claim 2,
the at least one processor further configured to execute the instructions to:
output the correlation model related to the format pattern of the log to be inspected in the correlation model when a result of determination indicates the abnormality.

4. The log analysis device according to claim 3,
the at least one processor configured to execute the instructions to:
output, in a manner associated with the operating status, the correlation model when the result of determination indicates the abnormality.

5. The log analysis device according to claim 2,
the at least one processor further configured to execute the instructions to:
analyze the existence of the abnormality in the monitored target, based on the log to be inspected and each format pattern of a plurality of predetermined logs.

6. The log analysis device according to claim 5,
the at least one processor configured to execute the instructions to:
output a first abnormality when a result of the analysis indicates the abnormality, and output a second abnormality when a result of the determination indicates the abnormality.

7. The log analysis device according to claim 1, the at least one processor configured to execute the instructions to further determine the existence of the abnormality based on whether or not the operating status based on the correlation model and an operating status to be inspected are included in a predetermined range.

8. The log analysis device according to claim 1, the at least one processor configured to execute the instructions to output the correlation model.

9. The log analysis device according to claim 1,
the at least one processor configured to execute the instructions to:
generate the correlation model between the format pattern of the log and the operating status when a variation in the log time series information of the format pattern and a variation in the operating status are included in a predetermined range.

10. A log analysis method comprising:
generating a correlation model based on a format pattern of log time series information output from a monitored target in a prescribed period and an operating status indicating time series performance information of the monitored target;
based on the correlation model, acquire a log to be inspected and an operating status to be inspected of the monitored target among the log time series information and the time series performance information, for a predetermined period at a predetermined interval; and
determining an existence of an abnormality in the monitored target, based on the correlation model.

11. A non-transitory computer-readable recording medium storing a program causing a computer to execute processing of:
generating a correlation model based on a format pattern of log time series information output from a monitored target in a prescribed period and an operating status indicating time series performance information of the monitored target;
based on the correlation model, acquiring a log to be inspected and an operation status to be inspected of the monitored target among the log time series information and the time series performance information, for a predetermined period at a predetermined interval; and
determining an existence of an abnormality in the monitored target, based on the correlation model.

* * * * *